US012793435B2

(12) United States Patent
Liu et al.

(10) Patent No.: US 12,793,435 B2
(45) Date of Patent: Nov. 10, 2026

(54) METHOD OF TRACKING MULTI-OBSTACLE OBJECTS IN FIELD ENVIRONMENT, SYSTEM THEREOF, DEVICE AND MEDIUM

(71) Applicant: Zhejiang University, Hangzhou City (CN)

(72) Inventors: Yufei Liu, Hangzhou City (CN); Yong He, Hangzhou City (CN); Yihao Wu, Hangzhou City (CN); Jichun Wang, Hangzhou City (CN)

(73) Assignee: ZHEJIANG UNIVERSITY, Hangzhou City (CN)

( * ) Notice: Subject to any disclaimer, the term of this patent is extended or adjusted under 35 U.S.C. 154(b) by 192 days.

(21) Appl. No.: 18/888,461

(22) Filed: Sep. 18, 2024

(65) Prior Publication Data

US 2025/0157226 A1 May 15, 2025

(30) Foreign Application Priority Data

Nov. 10, 2023 (CN) ......................... 202311491514.7

(51) Int. Cl.
*G06V 20/58* (2022.01)
*G06V 10/24* (2022.01)
(Continued)

(52) U.S. Cl.
CPC ............ *G06V 20/58* (2022.01); *G06V 10/243* (2022.01); *G06V 10/25* (2022.01); *G06V 10/74* (2022.01); *G06V 10/82* (2022.01)

(58) Field of Classification Search
CPC ........ G06V 20/58; G06V 10/25; G06V 10/74; G06V 10/82; G06V 10/243
See application file for complete search history.

(56) References Cited

U.S. PATENT DOCUMENTS 11,753,039 B2 * 9/2023 Scott ...................... B60K 35/10 701/26

FOREIGN PATENT DOCUMENTS

KR 20230079670 A * 6/2023 ............. G05D 1/244

OTHER PUBLICATIONS

Kragh, et al. (FieldSafe: Dataset for obstacle detection in agriculture). (Year: 2017).*

(Continued)

*Primary Examiner* — Daniel G Mariam
(74) *Attorney, Agent, or Firm* — Tutunjian & Bitetto, P.C.

(57) ABSTRACT

A method of tracking multi-obstacle objects in the field environment, a system, a device and a medium thereof are provided. The method includes using a Kalman filter to obtain prediction box center pixel coordinates and BEV object prediction center coordinates and using IMU data information to correct the prediction box center pixel coordinates. Obstacle object recognition is performed on an RGB image. Point cloud center coordinates are determined from the bird's eye view. The IMU data information is used to correct the point cloud center coordinates and an OCSORT model carries out minimum cost matching to obtain primary matching information. If detection boxes are matched with prediction boxes, the primary matching information is taken as successful matching information of the current frame, otherwise, an LAPJV algorithm is used to carry out minimum cost matching based on depth point cloud information to obtain the successful matching information of the current frame.

9 Claims, 4 Drawing Sheets

(51) Int. Cl.
*G06V 10/25* (2022.01)
*G06V 10/74* (2022.01)
*G06V 10/82* (2022.01)

(56) References Cited

OTHER PUBLICATIONS

Skoczen, et al. (Obstacle detection system for agricultural mobile robot application using RGB-D cameras). (Year: 2021).*
Computer English Translation of Korean Patent No. KR20230079670 A. (Year: 2023).*

* cited by examiner

METHOD OF TRACKING MULTI-OBSTACLE OBJECTS IN FIELD ENVIRONMENT, SYSTEM THEREOF, DEVICE AND MEDIUM

CROSS-REFERENCE TO RELATED APPLICATION

This patent application claims the benefit and priority of Chinese Patent Application No. 202311491514.7 filed with the China National Intellectual Property Administration on Nov. 10, 2023, the disclosure of which is incorporated by reference herein in its entirety as part of the present application.

TECHNICAL FIELD

The present disclosure relates to the technical field of multi-object tracking, in particular to a method of tracking multi-obstacle objects in a field environment, a system, a device and a medium thereof.

BACKGROUND

Multiple Object Tracking (MOT) refers to detecting multiple objects, such as pedestrians, vehicles and animals in the video without knowing the number of objects in advance, and assigning the multiple objects IDs for trajectory tracking. Different objects have different IDs, so as to achieve subsequent trajectory prediction, accurate search and so on. MOT plays a vital role in the environmental perception of agricultural robots, which mainly includes an appearance-based method and a motion-based method. In practical application, it is found that the appearance-based method is inefficient when dealing with objects with similar appearance or occlusion scenes, its performance is often inferior to that of a motion correlation algorithm, and it often takes a long time to extract appearance features and has poor real-time performance. However, in the rugged and complex field environment, a robot usually cannot run smoothly, so that a camera will move violently and irregularly due to the rugged terrain. The violent and irregular change of the field of view of the camera will lead to frequent switching of the IDs of the tracked objects and misjudgment made by the tracking algorithm, which brings great difficulties to the motion-based MOT method. The existing motion-based methods, such as Observation-Centric SORT (OCSORT) and Bytetrack, ignore the self-motion of the camera, so that the prediction in its Kalman filtering framework is inaccurate, and the IDs of the tracked objects frequently switch, thus leading to wrong tracking matching results.

SUMMARY

The present disclosure aims to provide a method of tracking multi-obstacle objects in a field environment, a system, a device and a medium thereof, so as to improve the tracking performance of an agricultural robot in the field environment.

In order to achieve the above purpose, the present disclosure provides the following solution:

A method of tracking multi-obstacle objects in a field environment is provided, including acquiring successful matching information of a previous frame and detection data information of a current frame, where the successful matching information of the previous frame includes obstacle center pixel coordinates and Bird's Eye View (BEV) object center point coordinates of the previous frame. The detection data information of the current frame includes an RGB (red, green, and blue) image, depth point cloud information and Inertial Measurement Unit (IMU) data information of the current frame.

Kalman filtering is carried out on the successful matching information of the previous frame to obtain prediction box center pixel coordinates and BEV object prediction center coordinates, and then the IMU data information is used to correct the prediction box center pixel coordinates to obtain image prediction box center coordinated.

Obstacle object recognition is carried out on the RGB image to obtain the image detection box center coordinates, and point cloud center coordinates are determined from a bird's eye view according to the depth point cloud information, and using the IMU data information to correct the point cloud center coordinates to obtain BEV object detection center coordinates.

The BEV object prediction center coordinates, the image prediction box center coordinates, the image detection box center coordinates and the BEV object detection center coordinates into an Observation-Centric Simple Online and Real-time Tracking (OCSORT) model are input to carry out minimum cost matching to obtain primary matching information, and determining whether detection boxes are matched with prediction boxes.

If the detection boxes are not matched with the prediction boxes, a cost matrix is constructed according to the BEV object prediction center coordinates and the BEV object detection center coordinates, and using a Linear Assignment Problem Jonker-Volgenant (LAPJV) algorithm to carry out minimum cost matching according to the cost matrix to obtain successful matching information of the current frame, where the successful matching information of the current frame includes obstacle center pixel coordinates and BEV object center point coordinates of the current frame.

If the detection boxes have been matched with the prediction boxes, the primary matching information is taken as the successful matching information of the current frame, and effective trajectories are updated according to the successful matching information of the current frame, and returning to a step of acquiring the successful matching information of the previous frame and the detection data information of the current frame.

Preferably, using the IMU data information to correct the prediction box center pixel coordinates to obtain image prediction box center coordinates specifically includes, determining a camera view angle of the previous frame, a camera view angle of the current frame, and an included angle between the current frame and the previous frame according to the IMU data information. A correction ratio value according to the camera view angle of the previous frame, the camera view angle of the current frame and the included angle between the current frame and the previous frame is calculated based on a triangle relation, and the prediction box center pixel coordinates are corrected according to the correction ratio value and a camera resolution to obtain image prediction box center coordinates.

Preferably, carrying out obstacle object recognition on the RGB images to obtain the image detection box center coordinates specifically includes using a YOLOv8 network model to carry out the obstacle object recognition on the RGB images to obtain the image detection box center coordinates.

Preferably, using the IMU data information to correct the point cloud center coordinates to obtain the BEV object detection center coordinates specifically includes determining a camera rotation angle according to the IMU data information, and using the camera rotation angle to correct the point cloud center coordinates to obtain the BEV objection detection center coordinates.

Preferably, constructing the cost matrix according to the BEV object prediction center coordinates and the BEV object detection center coordinates includes calculating horizontal and vertical coordinates of BEV object prediction box centers with respect to a camera origin according to the BEV object prediction center coordinates as prediction box coordinate information. Horizontal and vertical coordinates of BEV object detection box center with respect to the camera origin according to the BEV object detection center coordinates are calculated to determine detection box coordinate information. The Euclidean distances between the prediction boxes and the detection boxes are calculated according to the prediction box coordinate information and the detection box coordinate information, and the cost matrix according is constructed according to the Euclidean distances between all prediction boxes and all detection boxes.

Preferably, the LAPJV algorithm is used to carry out minimum cost matching according to the cost matrix to obtain successful matching information of the current frame. This includes using the LAPJV algorithm to carry out minimum cost matching according to the cost matrix to obtain secondary matching information and then comparing the Euclidean distances between the prediction boxes and the detection boxes in the secondary matching information. A matching pair of a prediction box and a detection box is discarded if the Euclidean distance is greater than a set threshold, and a matching pair of a prediction box and a detection box is reserved if the Euclidean distance is less than or equal to a set threshold, and taking processed secondary matching information as the successful matching information of the current frame.

Preferably, updating the effective trajectories according to the successful matching information of the current frame and returning to the step of acquiring the successful matching information of the previous frame and the detection data information of the current frame specifically includes updating the effective trajectories according to the successful matching information of the current frame, and determining whether the current frame is a last frame. If the current frame is not the last frame, returning to the step of acquiring the successful matching information of the previous frame and the detection data information of the current frame, and if the current frame is the last frame, terminating.

A system of tracking multi-obstacle objects in a field environment is provided, including a data acquiring module, a BEV object prediction center coordinate determining module, an image prediction box center coordinate determining module, an image detection box center coordinate determining module, a BEV object detection center coordinate determining module, an OCSORT matching module, a first matching information determining module, a second matching information determining module and an effective trajectory update module.

The data acquiring module acquires successful matching information of a previous frame and detection data information of a current frame, where the successful matching information of the previous frame includes obstacle center pixel coordinates and Bird's Eye View (BEV) object center point coordinates of the previous frame, and the detection data information of the current frame includes an RGB (red, green, and blue) image, depth point cloud information and Inertial Measurement Unit (IMU) data information of the current frame.

The BEV object prediction center coordinate determining module carries out Kalman filtering on the successful matching information of the previous frame to obtain prediction box center pixel coordinates and BEV object prediction center coordinates.

The image prediction box center coordinate determining module, uses the IMU data information to correct the prediction box center pixel coordinates to obtain image prediction box center coordinates.

The image detection box center coordinate determining modulecarries out obstacle object recognition on the RGB image to obtain image detection box center coordinates.

The BEV object detection center coordinate determining module determines point cloud center coordinates from a bird's eye view according to the depth point cloud information, and use the IMU data information to correct the point cloud center coordinates to obtain BEV object detection center coordinates.

The OCSORT matching module inputs the BEV object prediction center coordinates, the image prediction box center coordinates, the image detection box center coordinates and the BEV object detection center coordinates into an Observation-Centric Simple Online and Real-time Tracking (OCSORT) model to carry out minimum cost matching to obtain primary matching information, and determine whether detection boxes are matched with prediction boxes.

The first matching information determining module is configured to, if the detection boxes are not matched with the prediction boxes, construct a cost matrix according to the BEV object prediction center coordinates and the BEV object detection center coordinates, and use a Linear Assignment Problem Jonker-Volgenant (LAPJV) algorithm to carry out minimum cost matching according to the cost matrix to obtain successful matching information of the current frame, where the successful matching information of the current frame includes obstacle center pixel coordinates and BEV object center point coordinates of the current frame.

The second matching information determining module is configured to, if the detection boxes have been matched with the prediction boxes, take the primary matching information as the successful matching information of the current frame.

The effective trajectory update module updates effective trajectories according to the successful matching information of the current frame, and return to the data acquiring module.

An electronic device is provided, including a memory and a processor, wherein the memory is used to store a computer program, and the processor runs the computer program to cause the electronic device to execute the method of tracking multi-obstacle objects in the field environment described above.

A computer-readable storage medium is provided, in which a computer program is stored, wherein the computer program, when executed by a processor, implements the method of tracking multi-obstacle objects in the field environment described above.

According to the specific embodiments provided by the present disclosure, the present disclosure discloses the following technical effects.

The method of tracking multi-obstacle objects in the field environment provided by the present disclosure combines multi-sensor information including an RGB image, depth point cloud information and IMU data information, and uses an ICMC (IMU-based camera motion compensation) module and IMU data information to correct the prediction box center pixel coordinates to obtain the image prediction box center coordinates, and correct the point cloud center coordinates of the depth point cloud information to obtain the BEV object detection center coordinates, which can improve the detection accuracy and significantly reduce the occurrence of mismatching and missing matching. Based on the depth point cloud information, a Depth-Aware (DA) module is used to carry out secondary matching on the detection boxes and the prediction boxes in the OCSORT that are not matched successfully, which can achieve cross-frame matching in scenes where the camera frequently rotates from left to right so as to cause the object to move out of the field of view for a short time, be temporarily blocked or interrupted. Therefore, the present disclosure can improve the perception accuracy and the anti-interference capability of the agricultural robot in the field environment, and further improve its tracking performance.

BRIEF DESCRIPTION OF THE DRAWINGS

In order to explain the embodiments of the present disclosure or the technical solutions in the prior art more clearly, the drawings that need to be used in the embodiments will be briefly introduced. Obviously, the drawings in the following description are only some embodiments of the present disclosure. For those skilled in the art, other drawings can be obtained according to these drawings without creative labor.

DETAILED DESCRIPTION OF THE EMBODIMENTS

The technical solutions in the embodiments of the present disclosure will be clearly and completely described with reference to the drawings in the embodiments of the present disclosure hereinafter. Obviously, the described embodiments are only some embodiments of the present disclosure, rather than all of the embodiments. Based on the embodiments of the present disclosure, all other embodiments obtained by those skilled in the art without creative labor fall within the scope of protection of the present disclosure.

According to the existing methods based on motion detection, such as OCSORT and Bytetrack, in the rugged and complex field environment, a robot usually cannot run smoothly. A camera will move violently and irregularly due to the rugged terrain. The violent and irregular change of the field of view of the camera will lead to frequent switching of the IDs of the tracked objects and the occurrence of mismatching and missing matching. In order to solve the above problems, it is an object of the present disclosure to provide a method of tracking multi-obstacle objects in a field environment, a system, a device and a medium thereof, so as to improve the tracking performance of an agricultural robot in the field environment.

Specifically, the ICMC module proposed by the present disclosure is used. The positions of the prediction boxes can be corrected and compensated by using the camera motion information recorded by the IMU, thereby improving the detection accuracy and significantly reducing the occurrence of mismatching and missing matching. When the camera rotates frequently from left to right, which causes the detected objects to appear or disappear at the edge of the field of view, the predicted bounding boxes may extend beyond the actual field of view, which poses a problem for successfully matching the same object across frames. The DA module proposed by the present disclosure takes the positions of the detected objects with respect to the camera as a matching criterion, integrates this depth information into the tracking process, and carries out secondary matching on the detection boxes and the prediction boxes in the OCSORT that are not matched successfully, which can achieve cross-frame matching in the scene.

Generally speaking, the present disclosure proposes two brand-new ICMC and DA modules, combines IMU and point cloud data, innovatively applies them to the traditional OCSORT algorithm, and proposes a multi-object identifying and tracking method DA-OCSORT which can adapt to the harsh environment in the field, thus greatly improving the perception accuracy and the anti-interference capability of the agricultural robot in the field environment.

In order to make the above objects, features and advantages of the present disclosure more obvious and understandable, the present disclosure will be explained in further detail with reference to the drawings and detailed description hereinafter.

Figure 1:
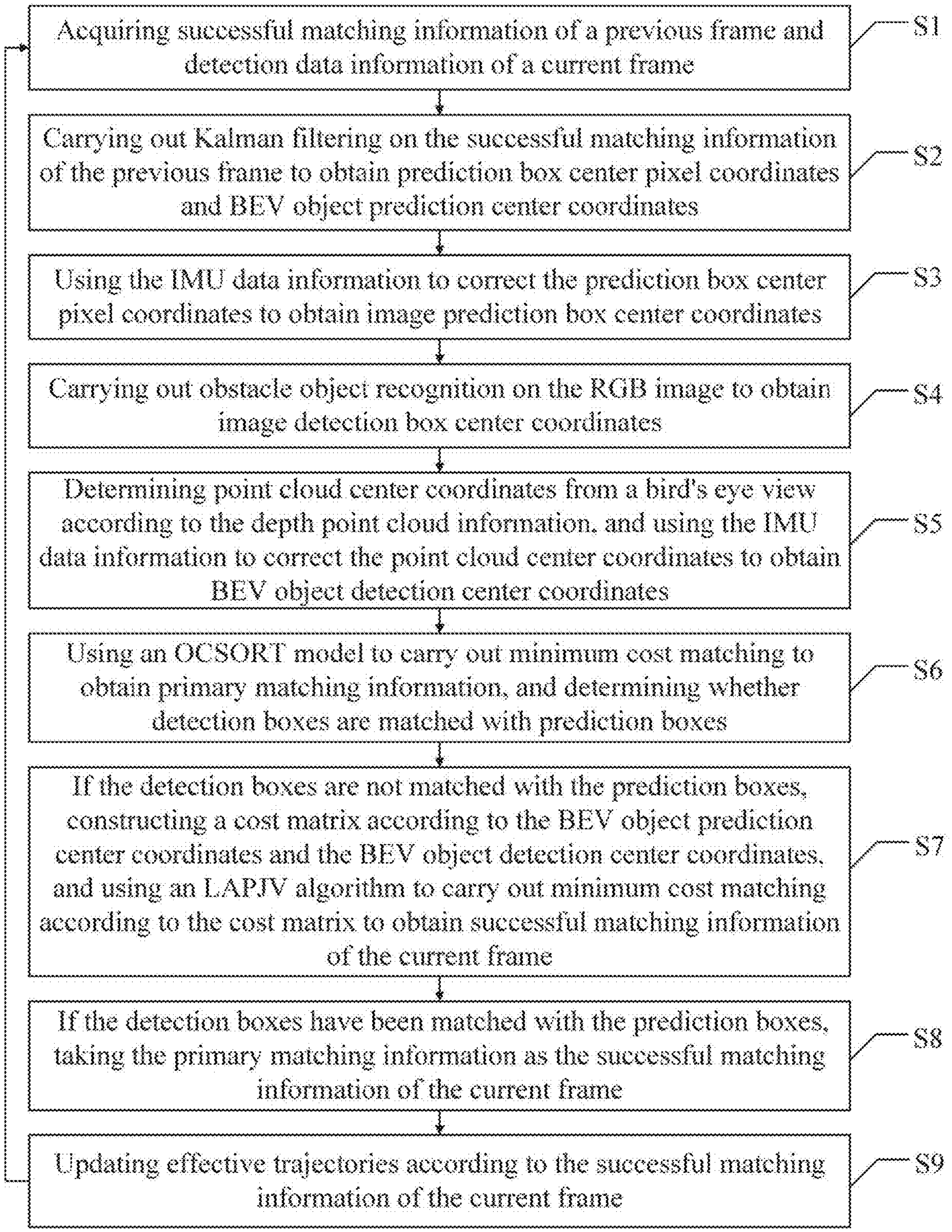
FIG. 1 is a flowchart of a method of tracking multi-obstacle objects in a field environment according to the present disclosure.
Figure 2:
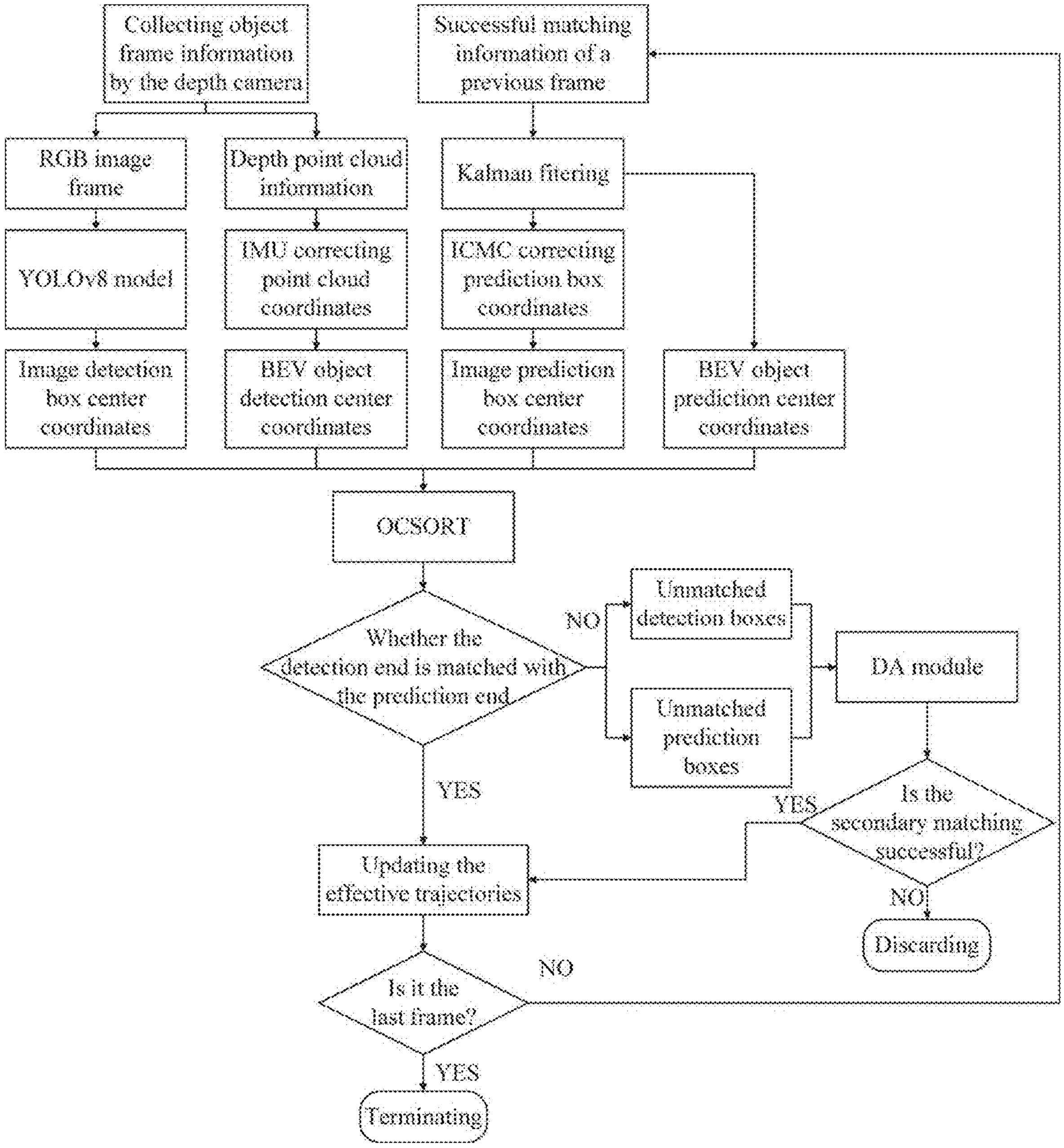
FIG. 2 is a frame diagram of a method of tracking multi-obstacle objects in a field environment according to the present disclosure.

The present disclosure provides a method of tracking multi-obstacle objects in a field environment, as shown in FIGS. 1 and 2. The method includes the following steps:

Step S1: successful matching information of a previous frame and detection data information of a current frame are acquired; wherein the successful matching information of the previous frame includes obstacle center pixel coordinates and BEV object center point coordinates of the previous frame; and the detection data information of the current frame includes an RGB image, depth point cloud information and IMU data information of the current frame.

BEV denotes bird's eye view, that is, a view of an object or scene from above, just like a bird looking down at the ground in the air. In the fields of autonomous drive and robots, the data acquired by sensors (such as LiDAR and cameras) are usually converted into the BEV, so as to better carry out tasks such as object detection and path planning. The BEV can simplify the complex three-dimensional environment into a two-dimensional image, which is especially important for efficient calculation in a real-time system.

In this embodiment, the RGB image and depth point cloud information of obstacles in the current frame are collected by a depth binocular camera, and the IMU data information is captured by the depth binocular camera, which are recorded as the detection data information of the current frame.

Step S2: Kalman filtering is carried out on the successful matching information of the previous frame to obtain prediction box center pixel coordinates and BEV object prediction center coordinates.

In this embodiment, the successful matching information of the previous frame (including the obstacle center pixel coordinates and the BEV object center point coordinates) is sent to a Kalman filter, so that the prediction box center pixel coordinates and the BEV object center point prediction coordinates output by the Kalman filter can be obtained.

Step S3: the IMU data information is used to correct the prediction box center pixel coordinates to obtain image prediction box center coordinates.

Figure 3:
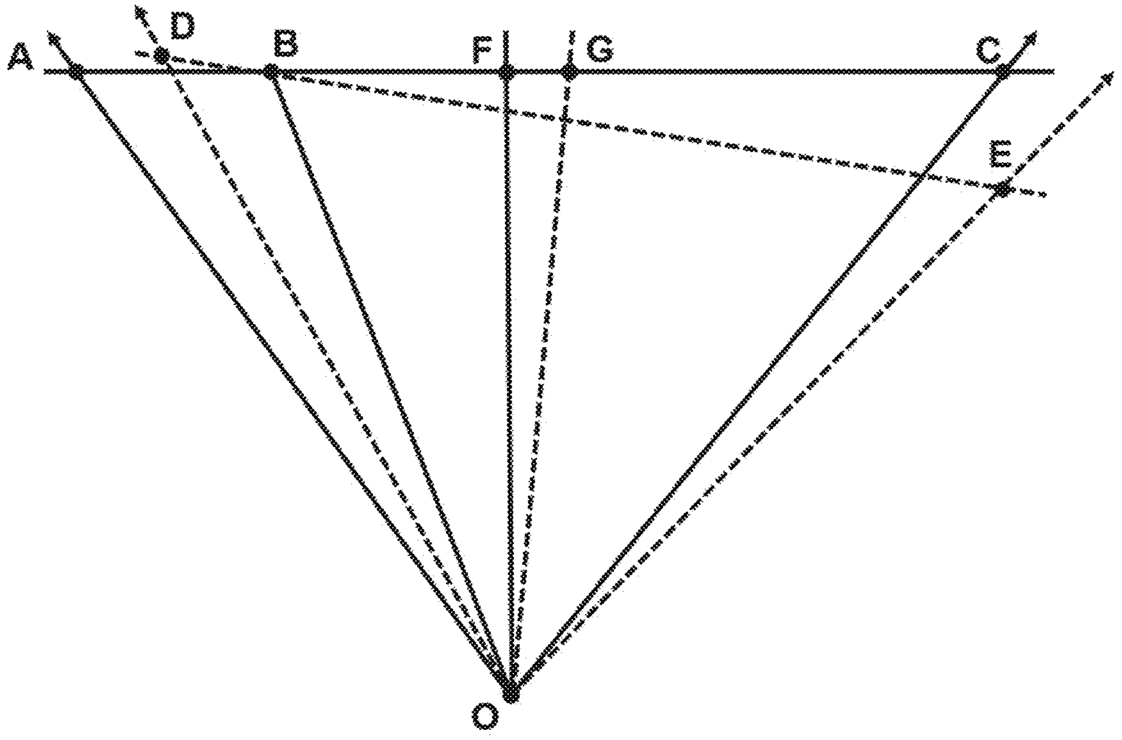
FIG. 3 is a schematic diagram of an ICMC module correcting prediction box center pixel coordinates according to the present disclosure.

In order to reduce the deviation resulted from the self-motion of the camera, the ICMC module proposed by the present disclosure is used to correct the prediction box center pixel coordinates. The ICMC correction process is shown in FIG. 3, where O is a camera origin, and point B are prediction coordinates obtained by the Kalman filter, that is, the prediction box center pixel position coordinate. The solid line corresponds to the previous frame coordinates, and the dotted line describes the current frame coordinates, that is, ∠AOC is the camera view angle of the previous frame, ∠DOE is the camera view angle of the current frame, AC intersects with DE, and the intersection point B is the prediction box center pixel point. The change angle in the x direction between two frames is denoted by $\theta_x$(∠AOD). ∠AOC and ∠DOE are equal to each other, which both denote the view angle $z_x$ of the camera in the x direction. OF and OG denote the bisector of the view angle between two frames, respectively, where AC is perpendicular to OF, and OG is perpendicular to DE.

As to the compensation methods of x axis and y axis: since the established geometric calculation relationship is completely the same, the calculation method of x axis is given as an example. Because the absolute positions of measuring points are the same between frames, the problem of self-motion compensation can be transformed into solving BD:DE under the given AB:AC condition. In this embodiment, the ratio BC:AB will be denoted by $r_x$, and the ratio BD:BE will be denoted by $e_x$. In order to simplify the formula, an intermediate calculation term $a_x$ is introduced. The following formula can be obtained through the triangular relationship:

$$e_x = \frac{(\tan a_x - \tan(0.5z_x))}{2\tan(0.5z_x)}$$

$$a_x = \theta_x + \tan^{-1}\left(\frac{(r_x - 1)\tan 0.5z_x}{(r_x + 1)}\right)$$

Therefore, the correction ratio value BD:DE of x axis, that is, $$\frac{e_x}{e_x + 1},$$

can be calculated. Using the known camera resolution, it is assumed that the number of pixels in the direction of x axis is $k_x$. The corrected x-axis coordinate X is obtained as follows:

$$X = k_x\left(\frac{e_x}{e_x + 1}\right)$$

The above process completes the correction of the x-axis coordinate of the prediction box center point in the image coordinate system. Similarly, the y-axis coordinate can be corrected. The corresponding geometric calculation relationship is completely the same as the x-axis correction geometric calculation relationship, that is, the following formula can be obtained through the triangular relationship:

$$e_y = \frac{(\tan a_y - \tan(0.5z_y))}{2\tan(0.5z_y)}$$

$$a_y = \theta_y + \tan^{-1}\left(\frac{(r_y - 1)\tan 0.5z_y}{(r_y + 1)}\right)$$

Further, the corrected y-axis coordinate Y is obtained as follows:

$$Y = k_y\left(\frac{e_y}{e_y + 1}\right)$$

Since the calculation relationship is unchanged, FIG. 3 is also regarded as a schematic diagram of correction calculation in the direction of y axis, where $k_y$ is the number of pixels in the direction of y axis, $$\frac{e_y}{e_y + 1}$$

is the correction ratio value of y axis, $\theta_y$ is the change angle in the y direction between two frames, $z_y$ is the camera view angle in the y direction, $e_y$ denotes the ratio BD:BE, $r_y$ denotes the ratio BC:AB, and $a_y$ represents an intermediate calculation term. (X, Y) is the image prediction box center coordinates.

In the above process, the camera view angle of the previous frame, the camera view angle of the current frame, and the included angle between the current frame and the previous frame are all determined based on the IMU data information. Based on the above process, the prediction box centers can be corrected, and then the positions of the corresponding prediction boxes can be corrected, which improves the accuracy and significantly reduces the occurrence of mismatching and missing matching.

Step S4: obstacle object recognition is carried out on the RGB image to obtain image detection box center coordinates.

The existing YOLOv8 network model is used to identify the obstacle objects in the RGB image, so as to obtain the detection box center position coordinates of the current frame and the length and width information of the detection boxes.

Step S5: point cloud center coordinates from a bird's eye view are determined according to the depth point cloud information, and the IMU data information is used to correct the point cloud center coordinates to obtain BEV object detection center coordinates.

Figure 4:
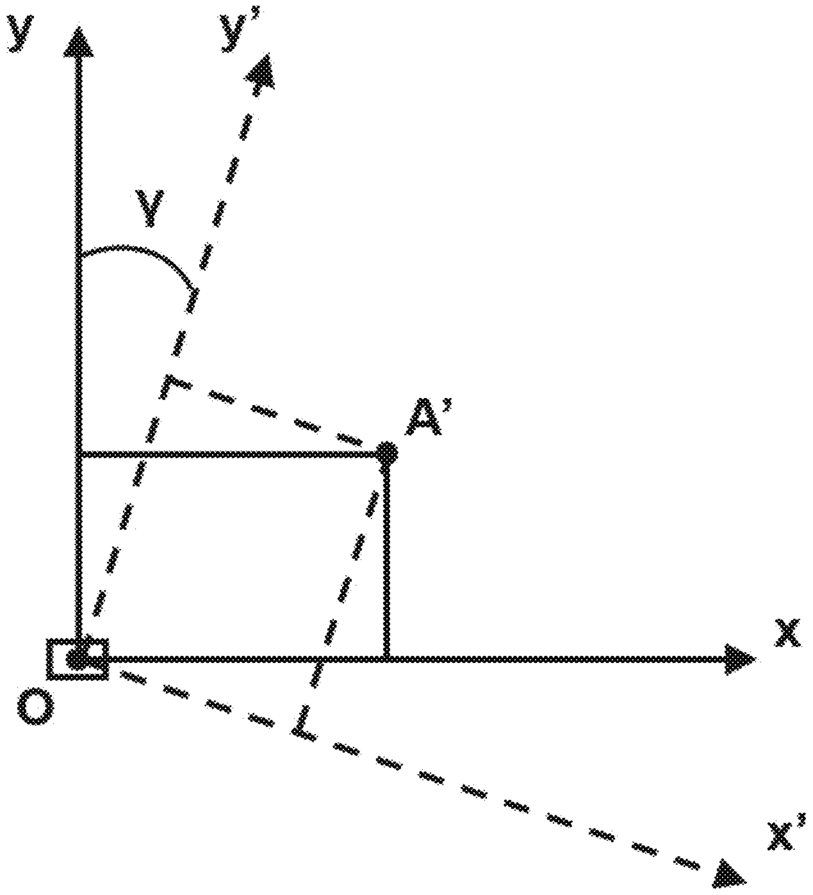
FIG. 4 is a schematic diagram of an IMU correcting point cloud center coordinates according to the present disclosure.

The IMU data recorded in each frame during shooting is used to correct the BEV object center point detection coordinates (that is, the point cloud center coordinates from the bird's eye view), that is, correct the changes of BEV coordinates resulted from the horizontal rotation of the camera. In the video stream, the BEV coordinate system is always fixed as the coordinate system of the first frame of the video, in which the camera position is the coordinate origin O, the direction facing the camera is the positive direction of y axis, and the right of the horizontal plane of the camera is the positive direction of x axis. The correction calculation method of the BEV coordinate is shown in FIG. 4. Because the translational motion of the camera has little influence on the positions of the detection boxes, the influence of the horizontal rotation of the camera on the position changes of the detection boxes is mainly taken into account during correction. In the figure, O is the camera origin position, the solid line is the coordinate system position of the first frame image of the camera, the dotted line is the coordinate system position after the camera rotates, and point A' is the center point position of the detection obstacle. Since the shooting frame rate is above 15 fps, the absolute position of point A' is approximately unchanged between two frames. Assuming that the coordinates of point A' are (a',b') in the x'oy' coordinate system, the coordinates are (a", b") in the xoy coordinate system, that is, the BEV object detection center coordinates. The camera rotation angle is determined based on the IMU data information and is denoted as $\gamma(\angle yoy')$. The transformation formula is as follows:

$$a''=a'\times\cos\gamma+b'\times\sin\gamma$$

$$b''=b'\times\cos\gamma-a'\times\sin\gamma$$

Step S6: the BEV object prediction center coordinates, the image prediction box center coordinates, the image detection box center coordinates and the BEV object detection center coordinates are input into an OCSORT model to carry out minimum cost matching to obtain primary matching information, and it is determined whether detection boxes are matched with prediction boxes.

Step S7: if the detection boxes are not matched with the prediction boxes, a cost matrix is constructed according to the BEV object prediction center coordinates and the BEV object detection center coordinates, and an LAPJV algorithm is used to carry out minimum cost matching according to the cost matrix to obtain successful matching information of the current frame; wherein the successful matching information of the current frame includes obstacle center pixel coordinates and BEV object center point coordinates of the current frame.

Step S8: if the detection boxes have been matched with the prediction boxes, the primary matching information is taken as the successful matching information of the current frame.

The center position data of all the prediction boxes in the previous frame and all the detection boxes in the current frame are sent to the OCSORT model, and the prediction boxes and the detection boxes that are successfully matched can be obtained through minimum cost matching.

For the prediction boxes and the detection boxes that fail to match in the OCSORT, the DA module proposed by the present disclosure is used for secondary matching to obtain secondary matching information. In the process of predicting and updating the trajectories of DA-OCSORT, the DA module uses a Kalman filter algorithm to predict and update the spatial position information of the object at the same time, and uses the BEV object center point coordinates of the current frame determined based on the depth point cloud information and the predicted position of the BEV object center point predicted by the Kalman filter to construct the cost matrix for the prediction boxes and the detection boxes that are not matched. The cost matrix records the Euclidean distance between all unmatched prediction boxes and detection boxes in the BEV. Based on the depth point cloud information, the present disclosure uses the LAPJV algorithm to carry out minimum cost matching (to minimize the total cost of matching). In the calculation process, the threshold value h is set to filter the matching pairs with the Euclidean distance greater than h, that is, the matching pairs greater than h will be discarded, while the matching pairs less than or equal to h will be reserved. The processed secondary matching information can be used as the successful matching information of the current frame. The DA module can keep the trajectory continuity when the object moves out of the field of view for a short time, is temporarily blocked or interrupted, thus improving the overall tracking performance:

$$Dis_{ab}=\sqrt{(a_x-b_x)^2+(a_y-b_y)^2}$$

$$CM=\begin{bmatrix} Dis_{11} & \dots & Dis_{a1} \\ \vdots & \ddots & \vdots \\ DIs_{1b} & \dots & Dis_{ab} \end{bmatrix}$$

where a denotes the BEV center position of the unmatched detection box, and b represents the BEV center position of the unmatched prediction box. $a_x$ and $a_y$ denote the horizontal and vertical coordinates of the BEV object detection box center with respect to a camera origin which are calculated based on the BEV object detection center coordinates, respectively, that is, the detection box coordinate information; $b_x$ and $b_y$ denote the horizontal and vertical coordinates of the object prediction box center with respect to the camera origin calculated based on the BEV object prediction center coordinates, that is, the prediction box coordinate information. The distance between two points is denoted as $Dis_{ab}$, which is the Euclidean distance between the prediction box and the detection box. CM is the cost matrix.

Step S9: effective trajectories are updated according to the successful matching information of the current frame, and the process returns to Step S1.

In this embodiment, corresponding effective trajectories are updated according to the detection boxes and the prediction boxes that have been successfully matched, which are used as the input of the Kalman filter of a next frame (including the obstacle detection box center pixel coordinates and the BEV object center point coordinates), and Steps S1-S9 are repeated until the current frame is the last frame.

To sum up, the present disclosure proposes the DA-OCSORT with two new modules, ICMC and DA, which records the self-motion of the camera through ICMC, and carries out position correction and compensation for the prediction boxes, so as to ensure that accurate object tracking can still be achieved under the condition that the camera has violent self-motion. The DA module can carry out secondary matching on the detection boxes of the current frame and the prediction boxes based on the historical path which are not successfully matched in the OCSORT under the BEV, track the BEV positions of the obstacles with respect to the camera, and keep the trajectory continuity when the objects move out of the field of view for a short time, are temporarily blocked or interrupted, thus improving the overall tracking performance.

The input of the traditional OCSORT matching process is the prediction box of each trajectory and the detection boxes of the current frame obtained by the Kalman filter based on the previous historical frame in the image coordinate system. By matching the prediction boxes with the detection boxes, a similarity threshold is set according to the IOU information of each match (the greater the IOU, the higher the similarity, and the easier it is to match). If the IOU of the matching pair is higher than this value, it means that the detection box is matched with the trajectory successfully, otherwise it fails. It can be seen that there are two situations in the OCSORT output: 1. the matching pairs that are successfully matched; and 2. the prediction boxes that are not successfully matched and the detection boxes that are not successfully matched.

Compared with the traditional OCSORT matching method, the ICMC module proposed by the present disclosure is mainly linked to the Kalman filter in the input part of the OCSORT prediction end. The camera attitude data obtained from the IMU is used to compensate for the center point positions of the prediction boxes of the Kalman filter, thus reducing the adverse influence of the self-motion of the camera on the MOT. The DA module is linked to the OCSORT after matching the images of the detection boxes and the prediction boxes, and in the process of prediction and update of the trajectories of the DA-OCSORT, the Kalman filter is used to predict and update the spatial position information of the objects at the same time, and the depth point cloud data from the depth binocular camera system is used to integrate the relative position information into the data association. In the BEV view, secondary matching is carried out on the detection boxes and the prediction boxes which are not successfully matched in the OCSORT, so as to keep the trajectory continuity when the objects move out of the field of view for a short time, are temporarily blocked or interrupted. The DA-OCSORT provided by the present disclosure takes fully into account the self-motion compensation of the camera, and improves the tracking performance in the field environment.

In order to implement the above methods and achieve corresponding functions and technical effects, a system of tracking multi-obstacle objects in the field environment is provided hereinafter. The system includes:

a data acquiring module, configured to acquire successful matching information of a previous frame and detection data information of a current frame; wherein the successful matching information of the previous frame includes obstacle center pixel coordinates and Bird's Eye View (BEV) object center point coordinates of the previous frame; and the detection data information of the current frame includes an RGB (red, green, and blue) image, depth point cloud information and Inertial Measurement Unit (IMU) data information of the current frame;

a BEV object prediction center coordinate determining module, configured to carry out Kalman filtering on the successful matching information of the previous frame to obtain prediction box center pixel coordinates and BEV object prediction center coordinates;

an image prediction box center coordinate determining module, configured to use the IMU data information to correct the prediction box center pixel coordinates to obtain image prediction box center coordinates;

an image detection box center coordinate determining module, configured to carry out obstacle object recognition on the RGB image to obtain image detection box center coordinates;

a BEV object detection center coordinate determining module, configured to determine point cloud center coordinates from a bird's eye view according to the depth point cloud information, and use the IMU data information to correct the point cloud center coordinates to obtain BEV object detection center coordinates;

an OCSORT matching module, configured to input the BEV object prediction center coordinates, the image prediction box center coordinates, the image detection box center coordinates and the BEV object detection center coordinates into an Observation-Centric Simple Online and Real-time Tracking (OCSORT) model to carry out minimum cost matching to obtain primary matching information, and determine whether detection boxes are matched with prediction boxes;

a first matching information determining module, configured to, if the detection boxes are not matched with the prediction boxes, construct a cost matrix according to the BEV object prediction center coordinates and the BEV object detection center coordinates, and use a Linear Assignment Problem Jonker-Volgenant (LAPJV) algorithm to carry out minimum cost matching according to the cost matrix to obtain successful matching information of the current frame; wherein the successful matching information of the current frame includes obstacle center pixel coordinates and BEV object center point coordinates of the current frame;

a second matching information determining module, configured to, if the detection boxes have been matched with the prediction boxes, take the primary matching information as the successful matching information of the current frame; and an effective trajectory update module, configured to update effective trajectories according to the successful matching information of the current frame, and return to the data acquiring module.

The present disclosure further provides an electronic device, including a memory and a processor, wherein the memory is used to store a computer program, and the processor runs the computer program to cause the electronic device to execute the method of tracking multi-obstacle objects in the field environment described above. The electronic device may be a server.

In addition, the present disclosure further provides a computer-readable storage medium, in which a computer program is stored, wherein the computer program, when executed by a processor, implements the method of tracking multi-obstacle objects in the field environment described above.

In this specification, various embodiments are described in a progressive way. The differences between an embodiment and other embodiments are highlighted, and the same and similar parts of various embodiments can be referred to each other. Since the system disclosed in the embodiment corresponds to the method disclosed in the embodiment, the system is described simply, and the description of the method can be referred to for relevant contents.

In the present disclosure, specific examples are applied to illustrate the principle and implementation of the present disclosure, and the explanations of the above embodiments are only used to help understand the method and core ideas of the present disclosure. At the same time, according to the idea of the present disclosure, there will be some changes in the specific implementation and application scope for those skilled in the art. To sum up, the contents of the specification should not be construed as limiting the present disclosure.

What is claimed is:

1. A method of tracking multi-obstacle objects in a field environment, comprising:

acquiring successful matching information of a previous frame and detection data information of a current frame; wherein the successful matching information of the previous frame comprises obstacle center pixel coordinates and Bird's Eye View (BEV) object center point coordinates of the previous frame; and the detection data information of the current frame comprises an RGB (red, green, and blue) image, depth point cloud information and Inertial Measurement Unit (IMU) data information of the current frame;

carrying out Kalman filtering on the successful matching information of the previous frame to obtain prediction box center pixel coordinates and BEV object prediction center coordinates;

using the IMU data information to correct the prediction box center pixel coordinates to obtain image prediction box center coordinates;

carrying out obstacle object recognition on the RGB image to obtain image detection box center coordinates;

determining point cloud center coordinates from a bird's eye view according to the depth point cloud information, and using the IMU data information to correct the point cloud center coordinates to obtain BEV object detection center coordinates;

inputting the BEV object prediction center coordinates, the image prediction box center coordinates, the image detection box center coordinates and the BEV object detection center coordinates into an Observation-Centric Simple Online and Real-time Tracking (OCSORT) model to carry out minimum cost matching to obtain primary matching information, and determining whether detection boxes are matched with prediction boxes;

if the detection boxes are not matched with the prediction boxes, constructing a cost matrix according to the BEV object prediction center coordinates and the BEV object detection center coordinates, and using a Linear Assignment Problem Jonker-Volgenant (LAPJV) algorithm to carry out minimum cost matching according to the cost matrix to obtain successful matching information of the current frame; wherein the successful matching information of the current frame comprises obstacle center pixel coordinates and BEV object center point coordinates of the current frame;

if the detection boxes have been matched with the prediction boxes, taking the primary matching information as the successful matching information of the current frame; and updating effective trajectories according to the successful matching information of the current frame, and returning to a step of acquiring the successful matching information of the previous frame and the detection data information of the current frame.

2. The method of tracking multi-obstacle objects in the field environment according to claim 1, wherein using the IMU data information to correct the prediction box center pixel coordinates to obtain image prediction box center coordinates comprises:

determining a camera view angle of the previous frame, a camera view angle of the current frame, and an included angle between the current frame and the previous frame according to the IMU data information;

calculating a correction ratio value according to the camera view angle of the previous frame, the camera view angle of the current frame and the included angle between the current frame and the previous frame based on a triangle relation; and correcting the prediction box center pixel coordinates according to the correction ratio value and a camera resolution to obtain image prediction box center coordinates.

3. The method of tracking multi-obstacle objects in the field environment according to claim 1, wherein carrying out obstacle object recognition on the RGB image to obtain the image detection box center coordinates comprises:

using a YOLOv8 network model to carry out the obstacle object recognition on the RGB image to obtain the image detection box center coordinates.

4. The method of tracking multi-obstacle objects in the field environment according to claim 1, wherein using the IMU data information to correct the point cloud center coordinates to obtain the BEV object detection center coordinates comprises:

determining a camera rotation angle according to the IMU data information; and using the camera rotation angle to correct the point cloud center coordinates to obtain the BEV object detection center coordinates.

5. The method of tracking multi-obstacle objects in the field environment according to claim 1, wherein constructing the cost matrix according to the BEV object prediction center coordinates and the BEV object detection center coordinates comprises:

calculating horizontal and vertical coordinates of BEV object prediction box centers with respect to a camera origin according to the BEV object prediction center coordinates as prediction box coordinate information;

calculating horizontal and vertical coordinates of BEV object detection box centers with respect to the camera origin according to the BEV object detection center coordinates as detection box coordinate information;

calculating Euclidean distances between the prediction boxes and the detection boxes according to the prediction box coordinate information and the detection box coordinate information; and constructing the cost matrix according to the Euclidean distances between all prediction boxes and all detection boxes.

6. The method of tracking multi-obstacle objects in the field environment according to claim 1, wherein using the LAPJV algorithm to carry out minimum cost matching according to the cost matrix to obtain successful matching information of the current frame comprises:

using the LAPJV algorithm to carry out minimum cost matching according to the cost matrix to obtain secondary matching information;

comparing Euclidean distances between the prediction boxes and the detection boxes in the secondary matching information;

discarding a matching pair of a prediction box and a detection box if ana Euclidean distance is greater than a set threshold;

reserving a matching pair of a prediction box and a detection box if ana Euclidean distance is less than or equal to the set threshold; and taking processed secondary matching information as the successful matching information of the current frame.

7. The method of tracking multi-obstacle objects in the field environment according to claim 1, wherein updating the effective trajectories according to the successful matching information of the current frame and returning to the step of acquiring the successful matching information of the previous frame and the detection data information of the current frame comprises:

updating the effective trajectories according to the successful matching information of the current frame, and determining whether the current frame is a last frame;

if the current frame is not the last frame, returning to the step of acquiring the successful matching information of the previous frame and the detection data information of the current frame; and if the current frame is the last frame, terminating.

8. An electronic device, comprising a memory and a processor, wherein the memory is used to store a computer program, and the processor runs the computer program to cause the electronic device to execute the method of tracking multi-obstacle objects in the field environment according to claim 1.

9. A system of tracking multi-obstacle objects in a field environment, comprising:

a data acquiring module acquires successful matching information of a previous frame and detection data information of a current frame; wherein the successful matching information of the previous frame comprises obstacle center pixel coordinates and Bird's Eye View (BEV) object center point coordinates of the previous frame; and the detection data information of the current frame comprises an RGB (red, green, and blue) image, depth point cloud information and Inertial Measurement Unit (IMU) data information of the current frame;

a BEV object prediction center coordinate determining module carries out Kalman filtering on the successful matching information of the previous frame to obtain prediction box center pixel coordinates and BEV object prediction center coordinates;

an image prediction box center coordinate determining module uses the IMU data information to correct the prediction box center pixel coordinates to obtain image prediction box center coordinates;

an image detection box center coordinate determining module carries out obstacle object recognition on the RGB image to obtain image detection box center coordinates;

a BEV object detection center coordinate determining module determines point cloud center coordinates from a bird's eye view according to the depth point cloud information, and uses the IMU data information to correct the point cloud center coordinates to obtain BEV object detection center coordinates;

an OCSORT matching module inputs the BEV object prediction center coordinates, the image prediction box center coordinates, the Image detection box center coordinates and the BEV object detection center coordinates into an Observation-Centric Simple Online and Real-time Tracking (OCSORT) model to carry out minimum cost matching to obtain primary matching information, and determines whether detection boxes are matched with prediction boxes;

a first matching information determining module constructs a cost matrix according to the BEV object prediction center coordinates and the BEV object detection center coordinates, and use a Linear Assignment Problem Jonker-Volgenant (LAPJV) algorithm to carry out minimum cost matching according to the cost matrix to obtain successful matching information of the current frame when the detection boxes are not matched with the prediction boxes, wherein the successful matching information of the current frame comprises obstacle center pixel coordinates and BEV object center point coordinates of the current frame;

a second matching information determining module takes the primary matching information as the successful matching information of the current frame when the detection boxes have been matched with the prediction boxes; and an effective trajectory update module updates effective trajectories according to the successful matching information of the current frame, and returns to the data acquiring module.

* * * * *